United States Patent
Nugent

(10) Patent No.: US 10,432,993 B2
(45) Date of Patent: Oct. 1, 2019

(54) OUTPUT AND PLAYBACK CONTROL DELIVERY FOR ADAPTIVE BITRATE STREAMING

(71) Applicant: ARRIS Enterprises LLC, Suwanee, GA (US)

(72) Inventor: Paul Adrian Nugent, Larne (GB)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/384,702

(22) Filed: Dec. 20, 2016

(65) Prior Publication Data
US 2018/0176623 A1 Jun. 21, 2018

(51) Int. Cl.
H04N 21/2662 (2011.01)
H04L 29/06 (2006.01)
(Continued)

(52) U.S. Cl.
CPC ..... *H04N 21/2662* (2013.01); *H04L 65/1069* (2013.01); *H04L 65/601* (2013.01); *H04N 21/235* (2013.01); *H04N 21/2387* (2013.01); *H04N 21/23439* (2013.01); *H04N 21/25808* (2013.01); *H04N 21/4325* (2013.01); *H04N 21/4408* (2013.01); *H04N 21/4621* (2013.01); *H04N 21/4627* (2013.01); *H04N 21/6334* (2013.01); *H04N 21/64322* (2013.01);
(Continued)

(58) Field of Classification Search
CPC ........... H04N 21/2662; H04N 21/2387; H04N 21/4627; H04N 21/4408; H04N 21/235; H04N 21/84; H04N 21/6334; H04L 65/601; H04L 65/1069
See application file for complete search history.

(56) References Cited

U.S. PATENT DOCUMENTS 9,554,175 B2 * 1/2017 Eyer ............... H04N 21/433
2012/0047542 A1 * 2/2012 Lewis ............. H04N 21/44016
725/97
(Continued)

FOREIGN PATENT DOCUMENTS

WO 2015/013411 A1 1/2015

OTHER PUBLICATIONS

PCT International Search Report & Written Opinion, RE: Application No. PCT/US2017/067471, dated Apr. 3, 2018.

Primary Examiner — Oschta I Montoya
(74) *Attorney, Agent, or Firm* — Thomas A. Ward

(57) ABSTRACT

A method is disclosed for customizing an adaptive bitrate streaming session using a manifest and control tags. The method includes establishing a network connection session between a client device and a manifest delivery controller, receiving a manifest request at the manifest delivery controller from the client device, wherein the manifest request identifies a video, determining whether one or more playback control rules and/or output control rules have been set at the manifest delivery controller that apply to the video and/or the client device, and sending a manifest and control tags from the manifest delivery controller to the client device, wherein the manifest identifies locations of a plurality of adaptive bitrate chunks of the video, and wherein the control tags are associated with playback control rules and/or output control rules that the manifest delivery controller determined applied to the video and/or the client device.

11 Claims, 5 Drawing Sheets

(51) Int. Cl.
    *H04N 21/2387*    (2011.01)
    *H04N 21/4627*    (2011.01)
    *H04N 21/4408*    (2011.01)
    *H04N 21/235*    (2011.01)
    *H04N 21/84*    (2011.01)
    *H04N 21/6334*    (2011.01)
    *H04N 21/2343*    (2011.01)
    *H04N 21/258*    (2011.01)
    *H04N 21/432*    (2011.01)
    *H04N 21/462*    (2011.01)
    *H04N 21/643*    (2011.01)
    *H04N 21/6543*    (2011.01)
    *H04N 21/6547*    (2011.01)
    *H04N 21/8355*    (2011.01)
    *H04N 21/845*    (2011.01)

(52) U.S. Cl.
    CPC ..... *H04N 21/6543* (2013.01); *H04N 21/6547* (2013.01); *H04N 21/8355* (2013.01); *H04N 21/84* (2013.01); *H04N 21/8456* (2013.01)

(56) References Cited

U.S. PATENT DOCUMENTS

| | | | |
|---|---|---|---|
| 2012/0197419 A1* | 8/2012 | Dhruv | H04N 21/6543 700/94 |
| 2014/0270338 A1* | 9/2014 | Zhao | G06T 1/0021 382/100 |
| 2015/0067722 A1* | 3/2015 | Bjordammen | H04N 21/2625 725/32 |
| 2016/0316244 A1 | 10/2016 | Biagini et al. | |
| 2016/0330500 A1* | 11/2016 | Houdaille | H04L 65/4084 |

* cited by examiner

202 →

```
#EXTM3U

#EXT-X-PLAYBACK_CONTROL: PAUSE
#EXT-X-PLAYBACK_CONTROL: FORWARD
#EXT-X-PLAYBACK_CONTROL: REWIND

#EXT-X-OUTPUT_CONTROL: HDMI_ENABLE
#EXT-X-OUTPUT_CONTROL: MIRROR_ENABLE
#EXT-X-OUTPUT_CONTROL: ANALOG_ENABLE

#EXT-X-TARGETDURATION:10
#EXT-X-MEDIA-SEQUENCE:0

#EXTINF:10,
http://example.com/contentA-0.ts
#EXTINF:10,
http://example.com/contentA-1.ts
#EXTINF:10,
http://example.com/contentA-2.ts
#EXTINF:10,
http://example.com/contentA-3.ts
#EXTINF:10,
http://example.com/contentA-4.ts
#EXTINF:10,
http://example.com/contentA-5.ts

#EXT-X-ENDLIST
```

```
#EXT-X-PLAYBACK_CONTROL: PAUSE
#EXT-X-PLAYBACK_CONTROL: FORWARD
#EXT-X-PLAYBACK_CONTROL: REWIND

#EXT-X-OUTPUT_CONTROL: HDMI_ENABLE
#EXT-X-OUTPUT_CONTROL: MIRROR_ENABLE
#EXT-X-OUTPUT_CONTROL: ANALOG_ENABLE
```

OUTPUT AND PLAYBACK CONTROL DELIVERY FOR ADAPTIVE BITRATE STREAMING

TECHNICAL FIELD

The present disclosure relates to the field of digital video streaming, particularly a system for enabling or disabling types of trick plays and/or output restrictions.

BACKGROUND

Streaming live or prerecorded video to client devices such as set-top boxes, computers, smartphones, mobile devices, tablet computers, gaming consoles, and other devices over networks such as the internet has become increasingly popular. Delivery of such video commonly relies on adaptive bitrate streaming technologies such as HTTP Live Streaming (HLS), HTTP Dynamic Streaming (HDS), Smooth Streaming, and MPEG-DASH.

Service providers, content owners and distributors, or other entities can place rules or restrictions on videos being delivered with adaptive bitrate streaming. In some cases rules set by entities can be playback controls that disable one or more types of trick plays during playback of a video, such as pausing, rewinding, fast-forwarding, or skipping to specific points in the video. For example, a content provider can use such rules to instruct client devices to prevent users from skipping past advertisements that have been inserted into a video. In other cases rules set by entities can be output controls that prevent users from outputting decoded video to other devices in one or more ways. Many client devices have HDMI-out ports or other video-out ports through which video from the client device can be passed to another device or screen. Similarly, many client devices offer methods of mirroring or casting images displayed on their screens to other displays. Outputting decoded video to other devices can increase the risk of unauthorized copying of the video. As such, a content provider can set rules instructing client devices to disable options for outputting decoded video to other devices.

While in some cases entities can set rules for a video that apply broadly to all users and/or client devices, in other cases entities can set targeted rules that apply to specific categories of client devices. Targeted rules can apply to specific types of client devices, client devices in specific geographic areas, client devices associated with specific user accounts, or that meet any other criteria. For example, an entity may want to allow set-top boxes to output decoded video over an HDMI cable to a television or other display, but want to restrict smartphones from wirelessly mirroring playback of that same decoded video to a separate display.

What is needed is a system and method of communicating applicable playback controls and/or output controls to individual client devices playing video via adaptive bitrate streaming.

SUMMARY

In one embodiment the present disclosure provides a method of customizing an adaptive bitrate streaming session, the method comprising establishing a network connection session between a client device and a manifest delivery controller, receiving a manifest request at the manifest delivery controller from the client device, wherein the manifest request identifies a video, determining whether one or more playback control rules and/or output control rules have been set at the manifest delivery controller that apply to the video and/or the client device, and sending a manifest and control tags from the manifest delivery controller to the client device, wherein the manifest identifies locations of a plurality of adaptive bitrate chunks of the video, and wherein the control tags are associated with playback control rules and/or output control rules that the manifest delivery controller determined applied to the video and/or the client device.

In another embodiment the present disclosure provides a method of customizing an adaptive bitrate streaming session, the method comprising receiving a program identifier from a client device at a manifest manipulator module, retrieving control rules at the manifest manipulator module from a content policy manager module, the control rules being playback control rules and/or output control rules that are associated with the program identifier, providing the program identifier and the control rules from the manifest manipulator module to a packager module, retrieving a preset manifest at the packager module from an object store module, the preset manifest listing adaptive bitrate chunks of a video stored at the object store module, retrieving an encryption key at the packager module from a digital rights management module, generating a media key tag at the packager module using the encryption key and the control rules, providing the media key tag and the preset manifest to the manifest manipulator module from the packager module, generating a custom manifest at the manifest manipulator module from the preset manifest and the media key tag, and providing the custom manifest from the manifest manipulator module to the client device, wherein the media key tag indicates the control rules to be enforced by the client device during playback of the video.

BRIEF DESCRIPTION OF THE DRAWINGS

Further details of the present invention are explained with the help of the attached drawings in which:

FIG. 3 depicts an example of a manifest.

FIG. 4 depicts an example of an auxiliary control file.

DETAILED DESCRIPTION

Figure 1:
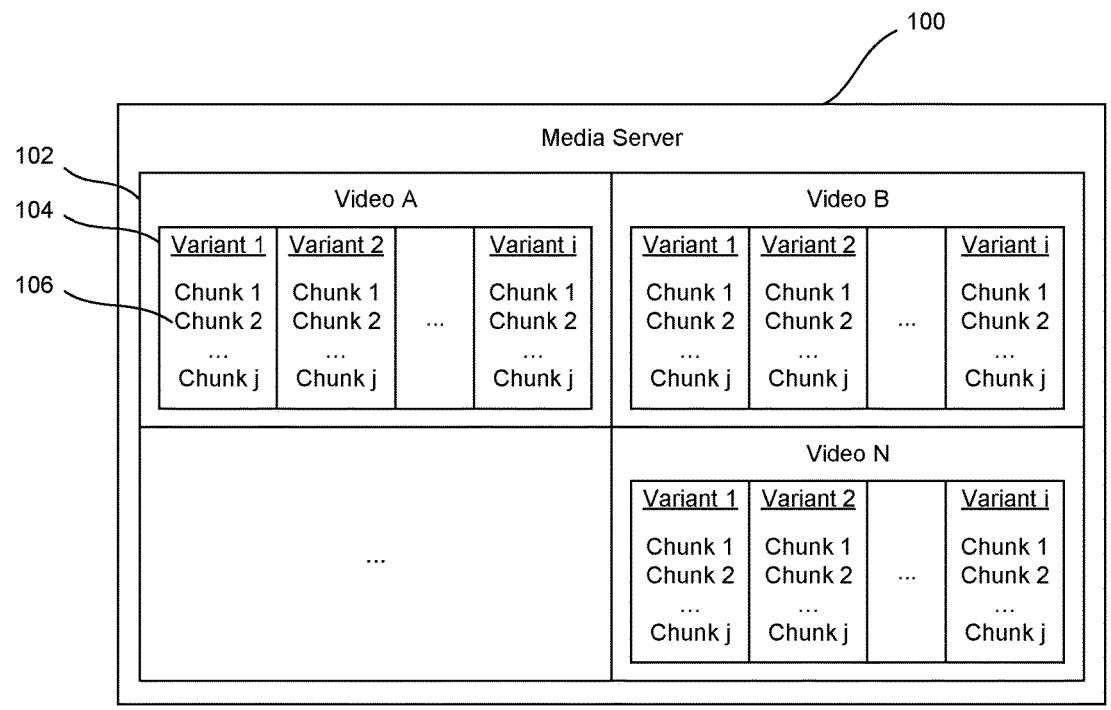
FIG. 1 depicts an exemplary embodiment of a media server.

FIG. 1 depicts an exemplary embodiment of a media server 100. A media server 100 can be a server or other network element that stores, processes, and/or delivers streaming video to other devices via adaptive bitrate streaming over a network such as the internet. By way of non-limiting examples, the media server 100 can be an Internet Protocol television (IPTV) server, over-the-top (OTT) server, or any other type of server or network element. The media server 100 can have one or more processors, data storage systems or memory, and/or communication links or interfaces.

As shown in FIG. 1, a media server 100 can store digitally encoded data for one or more videos 102, such as movies, television shows, video clips, or any other video. The videos 102 can be encoded with a video coding format and/or compression scheme such as MPEG-4 AVC (H.264), MPEG-2, HEVC, or any other format. In some situations or embodiments, the media server 100 can store more than one variant 104 of each video 102, such as variants 104 encoded at different bitrates and/or quality levels.

Each video 102 and/or variant 104 can be segmented into a plurality of chunks 106. In some adaptive bitrate streaming schemes chunks 106 can also be referred to as segments. Each chunk 106 can be stored on the media server 100 as an individually accessible file. By way of a non-limiting example, in some embodiments each chunk 106 can be an MPEG transport stream made available as a .ts file that encapsulates visual components of a video 102 encoded with a video coding format such as MPEG-4 AVC along with audio components of the video 102 encoded with an audio coding format such as AAC.

Figure 2:
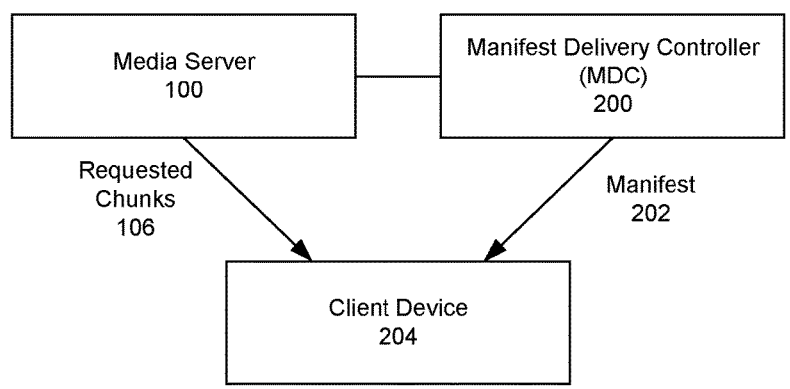
FIG. 2 depicts an exemplary system in which a manifest delivery controller (MDC) provides a manifest to a client device.

FIG. 2 depicts an exemplary system in which a manifest delivery controller (MDC) 200 provides a manifest 202 to a client device 204. A manifest 202 can be a playlist or other file that identifies one or more media servers 100 and/or file locations for videos 102, variants 104, and/or chunks 106 that are available from the media servers 100 using adaptive bitrate streaming. Adaptive bitrate streaming schemes can include HTTP Live Streaming (HLS), HTTP Dynamic Streaming (HDS), HTTP Smooth Streaming (HSS), MPEG-DASH (Dynamic Adaptive Streaming over HTTP) streaming, or any other type of adaptive bitrate streaming. By way of a non-limiting example, a manifest 202 can be a DASH MPD (Media Presentation Description).

The MDC 200 can be a server or any other network element that has access to information about videos 102, variants 104, and/or chunks 106 available from one or more media servers 100, such that it can generate manifests 202 that reference such data. In some embodiments an MDC 200 can be part of a media server 100. In other embodiments an MDC 200 can be a separate component that is loaded with information about data stored on one or more media servers 100, or that is in communication with such media servers 100 to access that information.

A client device 204 can be a set-top box, cable box, computer, smartphone, mobile device, tablet computer, gaming console, or any other device configured to request, receive, and play back video chunks 106 via adaptive bitrate streaming. A client device 204 can have one or more processors, data storage systems or memory, and/or communication links or interfaces.

The client device 204 can have software, firmware, and/or hardware through which it can request, decode, and play back video streams from a media server 100 using adaptive bitrate streaming. By way of a non-limiting example, a client device 204 can have an HLS player application through which it can decode and play HLS adaptive bitrate streams for users. As such, in the description below, mentions of a client device 204 can also refer to a media player application running on a client device 204. Such a media player application can be configured to receive commands input by users of the client device 204 to control playback of a decoded video 102.

A client device 204 can use a manifest 202 provided by the MDC 200 to request and receive chunks 106 of a video 102 from a media server 100. In some embodiments, HTTP (Hypertext Transfer Protocol) can be used as a content delivery mechanism to transport requested chunks 106 from the media server 100 to the client device 204. In other embodiments, other transport mechanisms or protocols such as RTP (Real-time Transport Protocol) or RTSP (Real Time Streaming Protocol) can be used to deliver chunks 106 from the media server 100 to client devices 204.

In some embodiments the MDC 200 can provide a client device 204 with a master manifest 202 that identifies other specialized manifests 202 for particular videos 102 and/or variants 104. By way of a non-limiting example, a client device 204 can review a master manifest 202 that lists the bitrate of each variant 104 of a video, such that it can determine which variant 104 is appropriate for its currently available bandwidth. The client device 204 can then use a specialized manifest 202 for that variant 104 that is identified by the master manifest 202 to request individual chunks 106.

Client devices 204 can request chunks 106 from the same or different variants 104 as their processing capabilities or available bandwidth changes over time. By way of a non-limiting example, a client device 204 can request chunks 106 from a low bitrate variant 104 when the client device's available bandwidth is low, but switch to requesting chunks 106 from a higher bitrate variant 104 when the client device's available bandwidth increases.

While a client device 204 can request and play back chunks 106 in sequential order for regular playback of a video 102, in some embodiments or situations a client device 204 can request chunks 106 out of order and/or play them at different speeds to perform trick plays. Trick plays can include rewinding, fast-forwarding, pausing, or skipping forward or backward in the video 102 during playback. By way of a non-limiting example, when each chunk 106 is ten seconds long the client device 204 can perform a trick play and skip to a point sixty seconds into a video 102 by requesting the seventh chunk 106. As will be discussed below, the client device 204 can be instructed by information provided in a manifest 202 or other file to enable or disable any or all types of trick plays.

In some cases a client device 204 can directly display decoded video 102 on screen. By way of a non-limiting example, a smartphone can comprise a screen and can directly display decoded video 102 on that screen. However, in some embodiments a client device 204 can output decoded video 102 other devices over a wired or wireless connection. In some situations a client device 204 can output decoded video 102 to be displayed on a separate screen, such as a television or monitor, instead of or in addition to displaying the decoded video 102 directly on the client device 204. By way of a non-limiting example, a client device 204 can comprise a video-out port for an HDMI cable, analog video cable, or any other type of video cable, such that the client device 204 can pass decoded video 102 to an external display over the video cable. By way of another non-limiting example, a client device 204 such as a smartphone can mirror or cast the images displayed on its own screen to an external display over a wired or wireless connection. As will be discussed below, the client device 204 can be instructed by information provided in a manifest 202 or other file to enable or disable output restrictions that disallow any or all types of video outputs from the client device 204 to other devices.

FIG. 3 depicts a non-limiting example of a manifest 202. A manifest 202 can comprise a series of chunk identifiers 302. Each chunk identifier 302 can describe information about a particular chunk 106 of a video 102 or variant 104, such as its location, identity, and/or duration. By way of a non-limiting example, each chunk identifier 302 can include a URL and/or filename describing the identity and location of an associated chunk 106 on a media server 100. In some embodiments, chunk identifiers 302 can also include a duration tag indicating the length of the associated chunk 106. By way of a non-limiting example, a chunk identifier 302 can include an #EXTINF tag that indicates the associated chunk's duration in seconds. Although FIG. 3 depicts a manifest 202 for a particular variant 104 of a video 102, a master manifest 202 can include tags that identify the location and/or identity of specialized manifests 202 for each variant 104 of the video 102.

As shown in FIG. 3, a manifest 202 can also comprise playback control tags 304 and/or output control tags 306. Such playback control tags 304 and output control tags 306 can appear in master manifests 202 and/or specialized manifests 202 for individual variants 104. In some embodiments each playback control tag 304 can be identified with the text "EXT-X-PLAYBACK_CONROL," and each output control tag 306 can be identified with the text "EXT-X-OUTPUT_CONROL." In other embodiments playback control tags 304 and output control tags 306 can have any other name or identifier.

While client devices 204 can be configured to perform trick plays and/or output decoded video 102 to other devices as described above, playback control tags 304 and output control tags 306 can specifically allow or disallow one or more of those features based on rules set by an entity such as a service provider, content owner, or distributor. By way of a non-limiting example, an entity can specify that some or all trick plays should be disallowed by a client device 204 during playback of a video 102 so that viewers watch advertisements inserted into the video 102 rather than fast-forwarding or jumping past them. By way of another non-limiting example, an entity can specify that client devices 204 should disallow outputting decoded video 102 to an exterior device in order to decrease the chances of outputted video being copied and pirated from the exterior device. By way of yet another non-limiting example, an entity can specify that client devices 204 should be allowed to output decoded video 102 to other devices when they are connected to their home Wi-Fi network, but not be allowed to output decoded video 102 to other devices when they are on a cellular data connection. As still another non-limiting example, an entity can specify that outputting video 102 to other devices should be disabled when it is detected that the client device 204 has been rooted or "jailbroken."

Each playback control tag 304 can have a field that indicates one or more types of trick plays that are to be enabled or disabled by a client device 204. In some embodiments a manifest 202 can have one playback control tag 304 for each type of trick play being enabled or disabled. In alternate embodiments a single playback control tag 304 can have multiple values to enable or disable more than one type of trick play.

In some embodiments all type of trick plays can be disabled by a client device 204 by default, and the client device 204 can enable specific types of trick plays identified by playback control tags 304 in a manifest 202. By way of a non-limiting example, the example manifest 202 shown in FIG. 3 includes playback control tags 304 with a "PAUSE" value that enables pausing, a "FORWARD" value that enables fast-forwarding, and a "REWIND" value that enables rewinding. In alternate embodiments all types of trick plays can be enabled by a client device 204 by default, and the client device 204 can disable specific types of trick plays identified by playback control tags 304 in a manifest 202. In still other embodiments, a playback control tag 304 can directly indicate whether it is enabling or disabling a particular type of trick play. By way of a non-limiting example, a playback control tag 304 can have a value of "FORWARD_ENABLE" to specifically enable fast-forwarding or a value of "FORWARD_DISABLE" to specifically disable fast-forwarding.

In some embodiments the value of a playback control tag 304 can be expressed in clear text, such as "FORWARD" to reference fast-forwarding or "REWIND" to reference rewinding. In other embodiments the value of a playback control tag 304 can be expressed in coded or obfuscated form, where one or more characters are associated with particular types of trick plays and the meaning behind values is known or can be decoded by client devices 204. By way of a non-limiting example, in some embodiments "EXT-X-PLAYBACK_CONTROL: 1" can refer to enabling fast-forwarding, while "EXT-X-PLAYBACK_CONTROL: 2" can refer to enabling rewinding.

In some embodiments a client device 204 can disable a type of trick play during playback of a video 102 according to a playback control tag 304 by presenting a user interface that omits controls for that type of trick play or has such controls grayed-out or otherwise inoperable. In other embodiments a client device 204 can disable a type of trick play according to a playback control tag 304 by displaying a message on a screen to users when they input a command to activate that type of trick play informing them that the trick play has been disabled, or by having no response to such a command.

Each output control tag 306 can have a field that indicates one or more types of output restrictions that are to be enabled or disabled by a client device 204. In some embodiments a manifest 202 can have one output control tag 306 for each type of output restriction being enabled or disabled. In alternate embodiments a single output control tag 306 can have multiple values to enable or disable more than one type of output restriction.

In some embodiments all type of output restrictions can be disabled by a client device 204 by default, and the client device 204 can enable specific types of output restrictions identified by output control tags 306 in a manifest 202. By way of a non-limiting example, the example manifest 202 shown in FIG. 3 includes output control tags 306 with an "HDMI_ENABLE" value that enables outputting decoded video 102 over an HDMI video cable, a "MIRROR_ENABLE" value that enables mirroring the playback of decoded video 102 on an external display, and an "ANALOG_ENABLE" value that enables outputting decoded video 102 over an analog video cable. In alternate embodiments all types of output restrictions can be enabled by a client device 204 by default, and the client device 204 can disable specific types of output restrictions identified by output control tags 306 in a manifest 202. In still other embodiments, an output control tag 306 can indicate whether it is enabling or disabling a particular type of output restriction. By way of a non-limiting example, an output control tag 306 can have a value of "HDMI_ENABLE" to specifically enable outputting decoded video 102 over an HDMI cable or a value of "HDMI_DISABLE" to specifically disable outputting decoded video 102 over an HDMI cable.

In some embodiments the value of an output control tag 306 can be expressed in clear text, such as "HDMI" to reference outputting video over an HDMI cable or "MIRROR" to reference mirroring the display of decoded video 102. In other embodiments, the value of an output control tag 306 can be expressed in coded or obfuscated form, where one or more characters are associated with particular output restrictions and the meaning behind values is known or can be decoded by client devices 204. By way of a non-limiting example, in some embodiments "EXT-X-OUTPUT_CONTROL: 1" can refer to enabling output of decoded video 102 via HDMI, while "EXT-X-OUTPUT_CONTROL: 2" can refer to enabling minoring the display of decoded video 102 on a different screen.

In some embodiments a client device 204 can implement an output restriction specified by an output control tag 306 by taking no action to output video 102 over the method indicated by the output control tag 306. By way of a non-limiting example, when an output control tag 306 disables outputting video 102 over an HDMI cable and a user plugs an HDMI cable into the client device 204, the client device 204 can avoid passing the video signal to the HDMI cable. In some embodiments, the client device 204 can present a message on a screen indicating that the attempted type of video output has been disabled.

FIG. 4 depicts a non-limiting example of an auxiliary control file 400. In some embodiments the MDC 200 can provide a client device 204 with both a manifest 202 and an auxiliary control file 400. In these embodiments the manifest 202 can include chunk identifiers 302 and/or other information about a video 102 or variant 104, while playback control tags 304 and output control tags 306 can be provided in a separate auxiliary control file 400. By way of a non-limiting example, in some embodiments a client device 204 can expect a manifest 202 in a particular format. As such, playback control tags 304 and output control tags 306 can be delivered to the client device 204 separately in an auxiliary control file 400 without altering the format of the manifest 202 expected by the client device 204.

In some embodiments the location of an auxiliary control file 400 at an MDC 200 can be directly referenced by a tag or other information in an associated manifest 202, such that a client device 204 reviewing the manifest 202 can request the auxiliary control file 400 from the referenced location. In other embodiments, the location of an auxiliary control file 400 can be determined programmatically by a client device 204 by analyzing attributes of the associated manifest 202. By way of a non-limiting example, when a client device 204 receives a manifest 202 that does not specify the location of an auxiliary control file 400 at the MDC 200, the client device 204 can use a predefined algorithm to generate a URL based on input parameters identified from the manifest 202, such as the number of chunk identifiers 302 included in the manifest 202, a name of a video 102 or variant 104 referenced in the manifest 202, the filename of the manifest 202, or any other attribute of the manifest 202. The client device 204 can then request the auxiliary control file 400 from the MDC 200 using the programmatically generated URL.

In some embodiments, when a client device 204 receives a manifest 202 that directly or indirectly identifies an auxiliary control file 400, the client device 204 can be configured to wait to begin requesting chunks 106 listed in the manifest 202 until it has requested and received the identified auxiliary control file 400. As such, the client device 204 can review playback control tags 304 and/or output control tags 306 in the auxiliary control file 400 and enforce the restrictions they identify during later video playback.

In some embodiments the MDC 200 can deliver manifests 202 and/or auxiliary control files 400 to client devices 204 in encrypted form, and authorized client devices 204 can decrypt the manifests 202 and/or auxiliary control files 400 with a decryption key. In some cases encryption of a manifest 202 or auxiliary control file 400 that contains playback control tags 304 and/or output control tags 306 can decrease the chances of users tampering with playback control rules and/or output control rules have been set for a video 102.

In some embodiments a manifest 202 and/or auxiliary control file 400 can be encrypted using a media key that was also used to encrypt chunks 106 listed in the manifest 202. By way of a non-limiting example, in these embodiments a client device 204 that is provided with a decryption key to decrypt and play back chunks 106 can also use that decryption key to decrypt the manifest 202 and/or auxiliary control file 400 and thereby access playback control tags 304 and/or output control tags 306 to enforce during playback of the chunks 106. In alternate embodiments manifests 202 and/or auxiliary control files 400 can be encrypted using different keys than the chunks 106.

Figure 5:
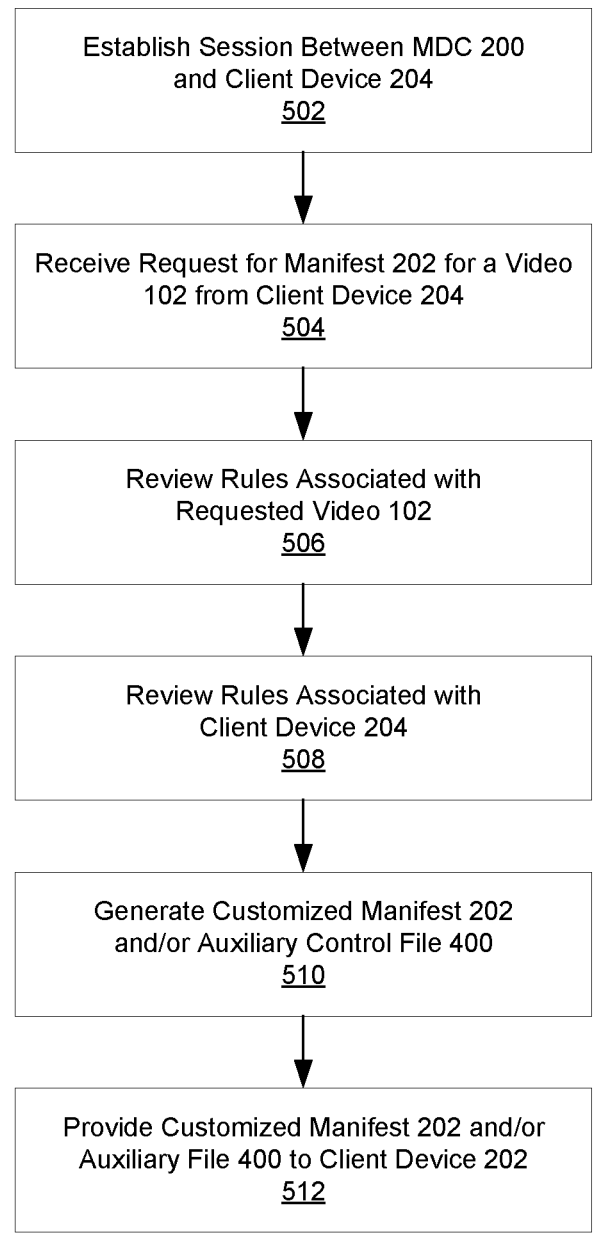
FIG. 5 depicts an exemplary method for generating custom manifests and/or auxiliary control files at an MDC for individual client devices on a session by session basis.

FIG. 5 depicts an exemplary method for generating custom manifests 202 and/or auxiliary control files 400 at an MDC 200 for individual client devices 204 on a session by session basis. Entities can set playback control rules and/or output control rules that are applicable to specific videos 102 or client devices 204. By way of non-limiting examples, different rules can be set for different videos 102, for different categories of videos 102, for different types of client devices 204, for client devices 204 with different screen resolutions, for client devices 204 in different geographic areas, for client devices 204 using different network connection methods, for client devices 204 that have been rooted or jailbroken, or for different user accounts that are logged in to client devices 204. As such, an MDC 200 can insert different playback control tags 304 and/or output control tags 306 into manifests 202 or auxiliary control files 400 that are delivered to different client devices 204.

At step 502, an MDC 200 can establish a network connection session with a client device 204. In some embodiments the client device 204 can provide information such as an account identifier and/or password for a user account logged in to the client device 204, a unique identifier for the client device 204, information identifying the type of client device 204, information identifying how the client device 204 is configured such as its screen resolution or a status identifier indicating whether it has been rooted or jailbroken, geographical coordinates for the client device's current location, and/or any other information. In some embodiments the client device 204 can provide credentials, such as a username and password or a digital certificate, to the MDC 200. If the MDC 200 verifies the credentials provided by the client device 204, the MDC 200 can authenticate the client device 204 and establish a session.

At step 504, the client device 204 can request a manifest 202 for a particular video 102. By way of a non-limiting example, the client device 204 can access a program guide through which it can obtain a program identification number or other identifier of a video 102, and can send a request for a manifest 202 associated with that identifier to the MDC 200.

At step 506, the MDC 200 can determine if any rules have been set that apply to the requested video 102. Such rules can include playback control rules and/or output control rules that have been set for the requested video 102, a category of videos 102 to which the requested video 102 belongs, or any other attribute of the requested video 102. By way of a non-limiting example, rules can be set to apply to videos 102 that are longer or shorter than a specific duration, or to videos 102 that are newer or older than a specific age.

At step 508, the MDC 200 can determine if any rules have been set that apply to the requesting client device 204. Such rules can include playback control rules and/or output control rules that have been set for the client device's device type, a geographic area where the client device 204 is currently located, the user account or account type logged in to the client device 204, or any other criteria.

At step 510, the MDC 200 can generate a customized manifest 202 and/or auxiliary control file 400 for the requesting client device 204. If the MDC 200 determined that any rules applied to the requested video 102 or to the requesting client device 204 during steps 508 and 510, the MDC 200 can insert corresponding playback control tags 304 and/or output control tags 306 into the manifest 202 or auxiliary control file 400. In some embodiments rules can be applicable depending on a combination of the requested video 102 and the requesting client device 204. By way of a non-limiting example, an entity can configured a rule for a particular video 102 that should be applied to some types of client devices 204 but not others. As such, in this example the MDC 200 can determine that a playback control tag 304 or output control tag 306 applies to the requested video 102 but should or should not be added to the custom manifest 202 or auxiliary control file 400 based on the device type reported by the client device 204.

In some embodiments the playback control tags 304 and/or output control tags 306 can be inserted into directly into the manifest 202. In other embodiments the MDC 200 can generate a new auxiliary control file 400 that includes the playback control tags 304 and/or output control tags 306, and the location of the new auxiliary control file 400 can be inserted into the manifest 202. In still other embodiments, the MDC 200 can generate a new auxiliary control file 400 and store it in a location that the client device can identify programmatically from attributes of the manifest 202.

In some embodiments the MDC 200 can also customize the manifest 202 for a particular session by adding or substituting chunk identifiers 302 for inserted advertisements or alternate content. By way of a non-limiting example, when a video 102 is broken into a series of chunks 106, the MDC 200 can cause a client device 204 to periodically divert from playing that series of chunks 106 to playing advertising content by inserting chunk identifiers 302 for advertising chunks 106 in between chunk identifiers 302 for chunks 106 of the video 102. In some embodiments the MDC 200 can tailor inserted chunk identifiers 302 for users on a session by session basis. By way of a non-limiting example, the MDC 200 can insert chunk identifiers 302 for chunks 106 of advertising content specific to the geographic location reported by the client device 204. Similarly, if the MDC 200 determines that a user account is not authorized to view a certain video 102, the MDC 200 can substitute chunk identifiers 302 for chunks 106 of an alternate video 102 that the user account is authorized to view, or chunks 106 of a blackout screen or message.

At step 512, the MDC 200 can deliver the customized manifest 202 and/or auxiliary control file 400 to the requesting client device 204. In some embodiments the manifest 202 and/or auxiliary control file 400 can be encrypted, such that the client device 204 can decrypt the files if it has the correct decryption key. The client device 204 can then use the chunk identifiers 302 in the manifest 202 to request, receive, decode, and/or decrypt chunks 106, subject to the trick play restrictions and/or output restrictions identified in the playback control tags 304 and/or output control tags 306.

Figure 6:
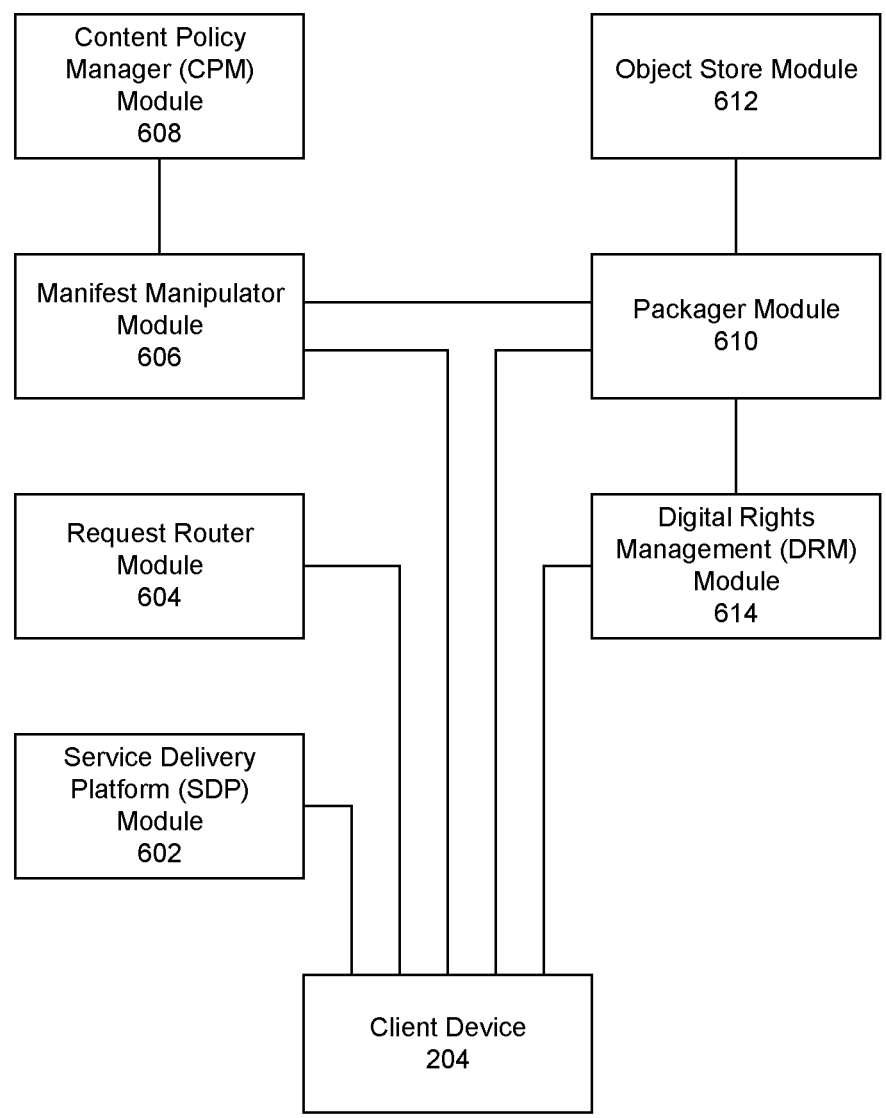
FIG. 6 depicts an alternate embodiment in which operations of an MDC and/or media server can be dispersed between multiple modules.

FIG. 6 depicts an alternate embodiment in which operations of an MDC 200 and/or a media server 100 can be dispersed between a service delivery platform (SDP) module 602, a request router module 604, a manifest manipulator module 606, a content policy manager (CPM) module 608, a packager module 610, an object store module 612, and a digital rights management (DRM) module 614. In some embodiments some or all of those modules can be combined into a single device or network element, while in other embodiments the modules can be separate devices or network elements.

The SDP module 602 can be a database that provides information to client devices 204 about video programs, such as prerecorded or live programs, that are available over a network connection. By way of a non-limiting example, a client device 204 can have an on-screen program guide that can be populated by data from the SDP module 602, such that users can review the on-screen program guide and select programs to watch.

The request router module 604 can receive network requests for chunks 106 from client devices 204 and either instruct the client device 204 to retrieve a chunk 106 from a cached location or to obtain the chunk 106 via the packager module 610.

The manifest manipulator module 606 can insert playback control tags 304 and/or output control tags 306 into a manifest 202 based on rules stored at the content policy manager module 608. The manifest manipulator module 606 can also insert alternate or additional chunk identifiers 302 into a manifest 202.

The packager module 610 can be a "just in time" packager that is linked with the manifest manipulator module 606, the object store module 612, the object store module 612, and the DRM module 614. The packager module 610 can retrieve chunks 106 and preexisting manifests 202 listing the available chunks for a video 102 from the object store module 612, and can provide such preexisting manifests 202 to the manifest manipulator module 606 for customization. The packager module 610 can also obtain encryption keys stored at the DRM module 614.

Figure 7:
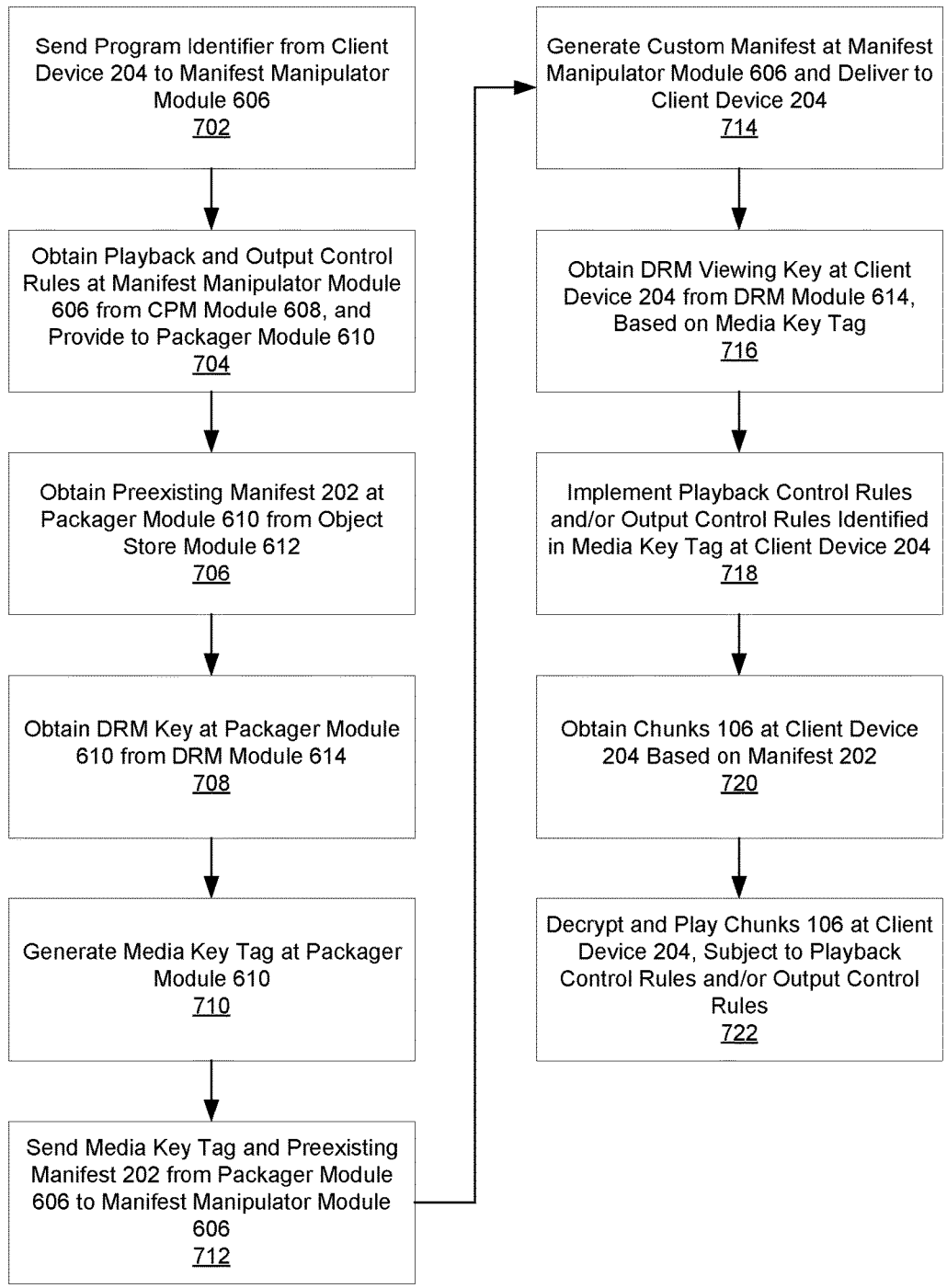
FIG. 7 depicts an exemplary process for obtaining a customized manifest at a client device using the system shown in FIG. 6.

FIG. 7 depicts an exemplary process for obtaining a customized manifest 202 at a client device 204 using the system shown in FIG. 6, and using that customized manifest 202 to request and play back chunks 106 according to playback control rules and/or output control rules.

At step 702, the client device 204 can send a program identifier to the manifest manipulator module 606. The program identifier can be associated with a video 102 that a user has selected using an on-screen program guide or other command at the client device 204. By way of a non-limiting example, the client device 204 can have a program guide populated with data from the SDP module 602, including program identifiers associated with each listed program.

At step 704, the manifest manipulator module 606 can obtain playback control rules and/or output control rules associated with the program identifier from the CPM module 608. The manifest manipulator module 606 can provide the program identifier as well as the playback control rules and/or output control rules to the packager module 610.

At step 706, the packager module 610 can obtain a preexisting manifest 202 associated with the program identifier from the object store module 612.

At step 708, the packager module 610 can obtain a DRM key associated with the program identifier from the DRM module 614.

At step 710, the packager module 610 can generate a media key tag. The media key tag can be a coded representation that identifies the playback control rules and/or the output control rules found during step 704, as well as an identifier for the DRM key obtained by the packager module 610 during step 708.

At step 712, the packager module 610 can send the media key tag and the preexisting manifest 202 to the manifest manipulator module 606.

At step 714, the manifest manipulator module 606 can generate a custom manifest 202 for the client device 204. The manifest manipulator module 606 can modify the preexisting manifest 202 by adding the media key tag received from the packager module 610. In some embodiments, the manifest manipulator module 606 can further modify the preexisting manifest 202 by adding or substituting chunk identifiers 302 for alternate or additional content, such as advertising content. The manifest manipulator module 606 can also alter the chunk identifiers 302 to point to the request router module 604. The manifest manipulator module 606 can send the customized manifest 202 to the requesting client device 204.

At step 716, the client device 204 can request a DRM viewing key from the DRM module 614. The client device 204 can use data in the media key tag found in the customized manifest 202 to request a DRM viewing key corresponding to the DRM key obtained by the packager module 610 during step 708. The client device 204 can provide a username and password, a digital certificate, or any other type of credentials to the DRM module 614 for authentication. If the DRM module 614 validates the provided credentials, it can send the requested DRM viewing key to the client device 204.

At step 718, the client device 204 can implement the playback control rules and/or the output control rules identified in the media key tag. By way of non-limiting examples, the client device 204 can disable identified trick play commands and/or disable the output of video signals to other devices via cables or wireless mirroring or casting.

At step 720, the client device 204 can obtain chunks 106 according to the chunk identifiers 302 on the customized manifest 202. The client device 204 can send network requests for chunks 106 to the request router module 604. If the request router module 604 determines that a chunk 106 is already stored at a network cache, the request router module 604 can direct the client device 204 to obtain the chunk 106 from the cache. However, if the chunk 106 is not stored at a cache, the request router module 604 can provide the client device 204 with a URL to request the chunk 106 from the packager module 610. The client device 204 can then request the chunk 106 from the packager module 610, and the packager module 610 can in turn obtain the requested chunk 106 from the object store module 612. The packager module 610 can then return the chunk 106 to the client device 204.

At step 722, after receiving a chunk 106 from the packager module 610 or a cache, the client device 204 can decrypt the chunk 106 using the DRM viewing key obtained during step 716. The client device can then decode and play back the chunk 106, subject to the playback control rules and/or the output control rules identified in the media key tag.

As described herein, information such as playback control tags 304 and/or output control tags 306 inserted into manifests 202 and/or auxiliary control files 400 can be enforced by client devices 204 to enable or disable restrictions on trick plays and/or video output to other devices. While such restrictions could be communicated on a general basis for all client devices 204 via control bits inserted into an MPEG transport layer, including playback control tags 304 and/or output control tags 306 in customized manifests 202 or auxiliary control files 400 allows restrictions to be enforced on a dynamic and targeted basis during sessions for individual client devices 204.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A method of customizing an adaptive bitrate streaming session, comprising:
   establishing a network connection session between a client device and a manifest delivery controller;
   receiving a manifest request at said manifest delivery controller from said client device, wherein said manifest request identifies a video;
   determining whether one or more playback control rules and/or output control rules have been set at said manifest delivery controller that apply to said video and/or said client device; and
   sending a manifest and control tags from said manifest delivery controller to said client device, wherein the control tags are provided separate from the manifest,
   wherein said manifest identifies locations of a plurality of adaptive bitrate chunks of said video,
   wherein said control tags are associated with the playback control rules and/or output control rules that said manifest delivery controller determined applied to said video and/or said client device, and
   wherein the manifest directly identifies the locations of the adaptive bitrate chunks rather than rely on a link and the control tags directly deliver the playback control rule information rather than rely on a link.

2. The method of claim 1, wherein said manifest delivery controller inserts said control tags in said manifest.

3. The method of claim 1, wherein said manifest delivery controller sends said control tags in an auxiliary control file separately from said manifest.

4. The method of claim 3, wherein said manifest delivery controller inserts an identifier for said auxiliary control file within said manifest.

5. The method of claim 3, wherein said manifest delivery controller stores said auxiliary control file at a location said client device can identify programmatically from attributes of said manifest.

6. The method of claim 3, wherein said manifest delivery controller encrypts said auxiliary control file using an encryption key that was also used to encrypt said video.

7. The method of claim 1, wherein said playback control tags refer to types of trick plays and are instructions to said client device to enable or disable said types of trick plays during playback of said video at said client device.

8. The method of claim 1, wherein said output control tags refer to types of video outputs from said client device to external devices and are instructions to said client device to enable or disable said types of video outputs during playback of said video at said client device.

9. The method of claim 1, wherein one of said playback control rules and/or output control rules apply to preset types of client devices.

10. The method of claim 1, wherein one of said playback control rules and/or output control rules apply to client devices in a preset geographic area.

11. The method of claim 1, wherein one of said playback control rules and/or output control rules apply to client devices associated with specific types of user accounts.

* * * * *